US008566784B2

(12) United States Patent
Driesen et al.

(10) Patent No.: US 8,566,784 B2
(45) Date of Patent: Oct. 22, 2013

(54) BUSINESS PROCESS CHANGE CONTROLLER

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 222 days.

(21) Appl. No.: 13/240,481

(22) Filed: Sep. 22, 2011

(65) Prior Publication Data

US 2013/0080339 A1    Mar. 28, 2013

(51) Int. Cl.
*G06F 9/44* (2006.01)

(52) U.S. Cl.
USPC ............ 717/104; 717/114; 717/120; 717/121

(58) Field of Classification Search
None
See application file for complete search history.

(56) References Cited

U.S. PATENT DOCUMENTS

| | | | |
|---|---|---|---|
| 6,257,774 B1 * | 7/2001 | Stack | 717/110 |
| 6,826,579 B1 * | 11/2004 | Leymann et al. | 717/131 |
| 7,404,175 B2 * | 7/2008 | Lee et al. | 717/104 |
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,971,209 B2 | 6/2011 | Eberlein et al. | |
| 2007/0239800 A1 | 10/2007 | Eberlein | |
| 2008/0082575 A1 | 4/2008 | Peter et al. | |
| 2008/0288960 A1 | 11/2008 | Eberlein et al. | |
| 2009/0144721 A1 | 6/2009 | Wagner et al. | |
| 2010/0153341 A1 | 6/2010 | Driesen | |
| 2010/0228788 A1 | 9/2010 | Eberlein | |
| 2010/0332585 A1 | 12/2010 | Driesen | |
| 2011/0145571 A1 | 6/2011 | Schmidt-Karaca et al. | |

OTHER PUBLICATIONS

U.S. Appl. No. 12/970,625, filed Dec. 16, 2010, Driesen.
U.S. Appl. No. 13/162,442, filed Jun. 16, 2011, Said et al.
"Big bang adoption", http://en.wikipedia.org/wiki/Big_bang_adoption, retrieved on Sep. 22, 2011, 9 pages.

* cited by examiner

*Primary Examiner* — Chuck Kendall
(74) *Attorney, Agent, or Firm* — Fish & Richardson P.C.

(57) ABSTRACT

The present disclosure involves computer-implemented methods, software, and systems for managing a transition between business process models. A computer-implemented method includes in parallel with a first business process model, instantiating, using at least one hardware processor, a second business process model, instantiating a temporary exit process step of a set of temporary exit process steps associated with the first business process model and a temporary entry process step of a set of temporary entry process steps associated with the second business process model, coupling an exit transition rule of a set of exit transition rules associated with the first business process model to the first business process model, and activating the exit transition rule after activating the second business process model.

21 Claims, 7 Drawing Sheets

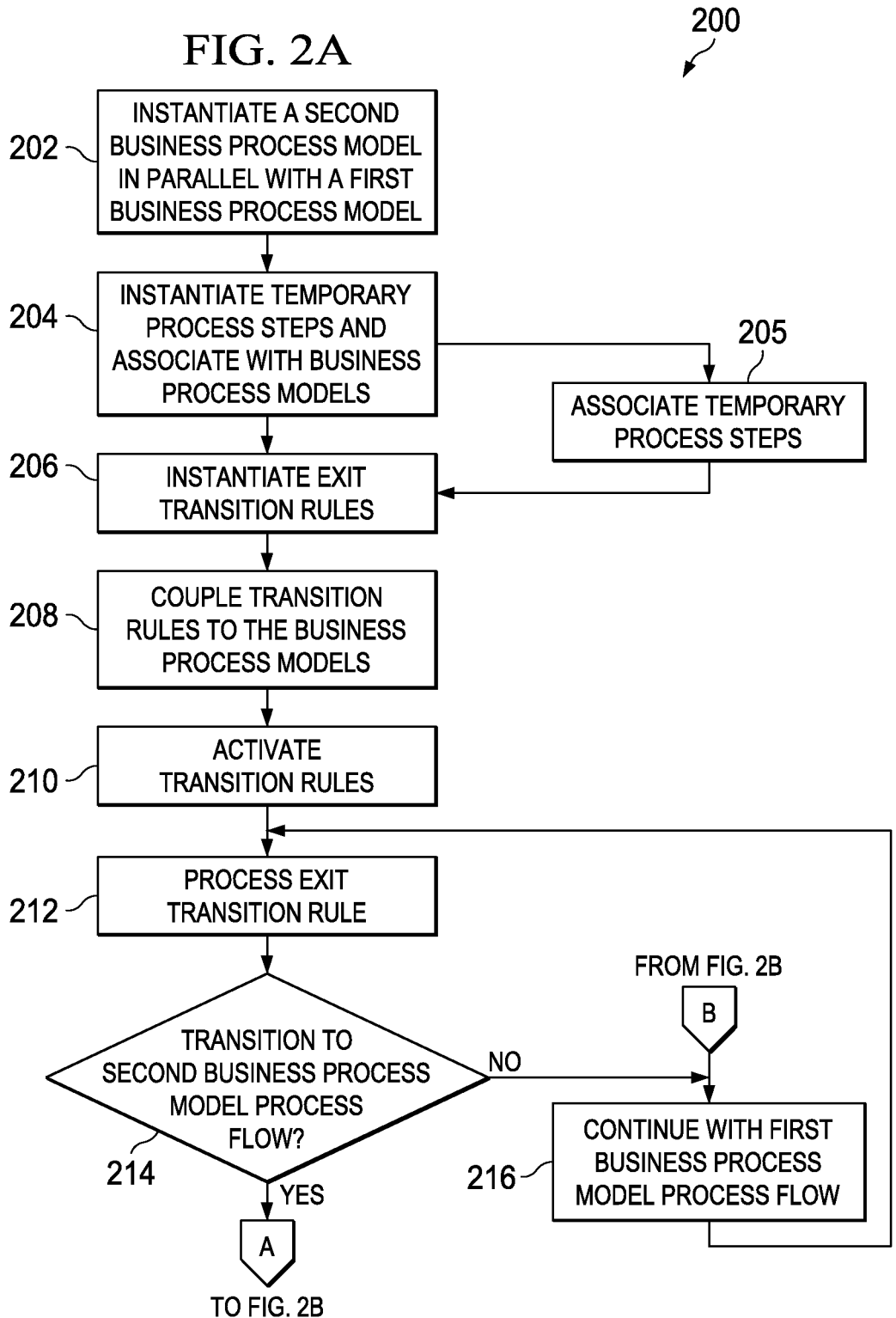

BUSINESS PROCESS CHANGE CONTROLLER

TECHNICAL FIELD

The present disclosure relates to computer-implemented methods, software, and systems for managing a transition between business process models.

BACKGROUND

Business processes defined by business process models in modern enterprise resource planning (ERP) systems typically define several process steps. Many business processes have evolved from single-enterprise business processes into interconnected and networked business processes involving numerous, geographically-distributed business entities. The execution of a complete business process model may take an extended period of time, include different manual activities, and involve more than one business entity. A business organization wishing to transition from an executing first business process model to a second business process model may face a situation where various process steps of the first business process model may have already executed and it would be impractical or impossible for the organization to immediately transition to the second business process model or to stop the first business process model.

SUMMARY

The present disclosure relates to computer-implemented methods, software, and systems for managing a transition between business process models. One computer-implemented method includes in parallel with a first business process model, instantiating, using at least one hardware processor, a second business process model, instantiating a temporary exit process step of a set of temporary exit process steps associated with the first business process model and a temporary entry process step of a set of temporary entry process steps associated with the second business process model, wherein the temporary exit process step is interoperably coupled to the first business process model, the temporary exit process step is interoperably coupled to the temporary entry process step, and the temporary entry process step is interoperably coupled to the second business process model, coupling an exit transition rule of a set of exit transition rules associated with the first business process model to the first business process model, and activating the exit transition rule after activating the second business process model, wherein the exit transition rule determines whether to execute the temporary exit process step.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIGS. 2A-2B are flowcharts of an example process for managing a transition between business process models.

DETAILED DESCRIPTION

Figure 1:
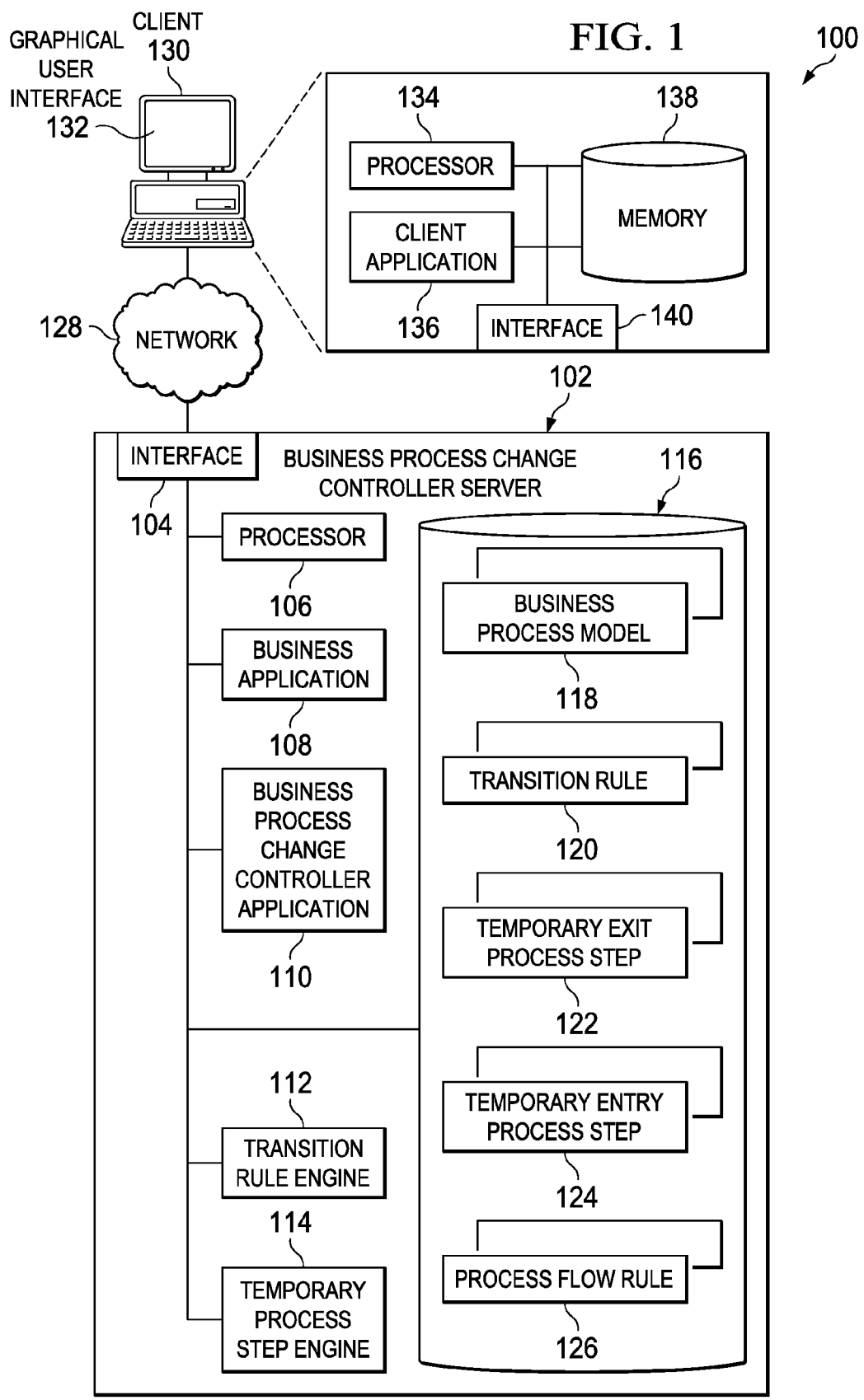
FIG. 1 illustrates an example environment for implementing various features of a system for managing a transition between business process models.

This disclosure generally describes computer-implemented methods, software, and systems for managing a transition between business process models. Specifically described are computer-implemented methods, software, and systems for automatically managing the transition through the use of a business process model change process including exit transition rules and temporary exit and entry steps.

In various implementations, a business process model defines a set of process steps operable to perform a defined business process. Each process step of a business process model defines at least one business-related activity and is linked to at least one other process step by at least one process flow rule. The process flow rules define and manage a process flow through the business process model. In some implementations, process flow rules are metadata or other data used to link process steps.

In various implementations, a second business process model is instantiated in parallel with a first business process model. Temporary exit process steps associated with the first business process model are instantiated. Temporary entry process steps associated with the second business process model are instantiated. Exit transition rules associated with the first business process model decide whether to execute process steps associated with the first business process model or to divert the first business process model process flow using the temporary exit process steps. A diverted first business process model process flow is then directed into a second business process model process flow using temporary entry process steps.

In various implementations, the management of the transition from the first business process model to the second business process model is complete when all the exit transition rules associated with the first business process model indicate that no process step of the first business process model may again be executed. Once the transition between business process models is complete, a deactivation method and a deletion method may be executed.

Previously, the management of a transition between different business process models was a time-consuming and manual exercise in logistics, especially with respect to complex business processes models that involve many business entities and associated dependencies. The advantages of the present disclosure are numerous. First, a business process model change process can now be modeled. Modeling provides a business organization with a storable, repeatable, and auditable business process model change process in order to satisfy various legal requirements. The repeatable nature of the models also optimizes the use of business resources and helps reduce unnecessary duplication of effort. Further, automated execution of the modeled business process model change process through the use of business process automation enhances and optimizes business efficiency. The transition from the previous business process to the new business process may be controlled by external parameters. The modeled business process model change process may also be analyzed and modified by the business organization in order to incorporate various efficiency improvements in order to enhance the model's usefulness.

Turning to the figures, FIG. 1 illustrates an example environment 100 for implementing various features of system providing management of a transition between business process models in accordance with one implementation of the present disclosure. In some implementations, a second business process model will chronologically follow a first business process model. Therefore, a second business process model may, in fact, be chronologically older than a first business process model. In some implementations, a first business process model and a second business process model may also be different versions of the same business process model. The illustrated environment 100 includes, or is communicably coupled with, at least one business process change controller server 102 and at least one client 130. At least one client 130 and the business process change controller server 102 may communicate across or via network 128. In general, example environment 100 depicts an example configuration of a system capable of providing management of a transition between business process models. In alternative implementations, the elements illustrated within the business process change controller server 102 and/or the client 130 may be included in or associated with different and/or additional servers, clients, networks, or locations other than those illustrated in FIG. 1. For example, the components illustrated within the business process change controller server 102 may be included in multiple servers, cloud-based networks, or other locations accessible to the business process change controller server 102 (e.g., either directly or via network 128).

In general, the business process change controller server 102 is any server that stores and manages a transition between business processes models via the business process change controller application 110, where the business process change controller application 110 is associated with at least one business process model 118 instance.

For example, each business process change controller server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the business process change controller server 102. In some implementations, each business process change controller server 102 may store a plurality of various other applications (not shown), while in other implementations, each business process change controller server 102 may be a dedicated server meant to store and execute a particular business process change controller application 110 and its related functionality, as well as a set of particular business process change controller applications 110. In some implementations, the business process change controller server 102 may comprise a web server or be communicably coupled with a web server, where the particular business process change controller application 110 associated with that business process change controller server 102 represents a web-based (or web-accessible) application accessed and executed on an associated at least one client 130 to perform the programmed tasks or operations of the corresponding business process change controller application 110, as well as to provide user interactions with a business process.

At a high level, the business process change controller server 102 comprises an electronic computing device operable to receive, transmit, process, store, or manage data and information associated with the example environment 100. The business process change controller server 102 illustrated in FIG. 1 can be responsible for receiving application requests from at least one client 130 (as well as any other entity or system interacting with the business process change controller server 102), responding to the received requests by processing said requests in an associated business process change controller application 110, and sending the appropriate responses from the business process change controller application 110 back to the requesting client 130 or other requesting system. The business process change controller application 110 can also process and respond to local requests from a user locally accessing the associated business process change controller server 102. Accordingly, in addition to requests from the external clients 130 illustrated in FIG. 1, requests associated with a particular business process change controller application 110 may also be sent from internal users, external or third-party customers, and other associated business process applications, as well as any other appropriate entities, individuals, systems, or computers. In some implementations, the business process change controller application 110 may be a web-based application executing functionality associated with the networked or cloud-based business process.

As used in the present disclosure, the term "computer" is intended to encompass any suitable processing device. For example, although FIG. 1 illustrates a single business process change controller server 102, example environment 100 can be implemented using any number of servers, as well as computers other than servers, including a server pool. Indeed, the business process change controller server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated business process change controller server 102 may be adapted to execute any operating system, including Linux, UNIX, Windows, Mac OS, WebOS, iOS, Android, or any other suitable operating system.

In the illustrated implementation of FIG. 1, the business process change controller server 102 includes an interface 104, a processor 106, a memory 116, at least one business application 108, and at least one business process change controller application 110. The illustrated business process change controller server 102 further includes additional components, including a transition rule engine 112 and a temporary step engine 114. While illustrated as a single component in the example environment 100 of FIG. 1, alternative implementations may illustrate the business process change controller server 102 as comprising multiple parts or portions accordingly.

The interface 104 is used by the business process change controller server 102 to communicate with other systems in a client-server or other distributed environment (including within example environment 100) connected to the network 128 (e.g., an associated client 130, as well as other systems communicably coupled to the network 128). FIG. 1 depicts both a server-client environment, but could also represent a cloud-computing network. Various other implementations of the illustrated example environment 100 can be provided to allow for increased flexibility in the underlying system, including multiple business process change controller servers 102 performing or executing at least one additional or alternative implementations of the business process change controller application 110, as well as other applications associated with or related to the business process change controller application 110. In those implementations, the different business process change controller servers 102 may communicate with each other via a cloud-based network or through the connections provided by network 128. Returning to the illustrated example environment 100, the interface 104 generally comprises logic encoded in software and/or hardware in a suitable combination and operable to communicate with the network 128. More specifically, the interface 104 may comprise software supporting at least one communication protocol associated with communications such that the network 128 or the interface's hardware is operable to communicate physical signals within and outside of the illustrated example environment 100.

Generally, the business process change controller server 102 may be communicably coupled with a network 128 that facilitates wireless or wireline communications between the components of the example environment 100 (i.e., between the business process change controller server 102 and at least one client 130), as well as with any other local or remote computer, such as additional clients, servers, or other devices communicably coupled to network 128, including those not illustrated in FIG. 1. In the illustrated example environment 100, the network 128 is depicted as a single network, but may be comprised of more than one network without departing from the scope of this disclosure, so long as at least a portion of the network 128 may facilitate communications between senders and recipients. In some implementations, at least one component associated with the business process change controller server 102 may be included within the network 128 as at least one cloud-based service or operation. The network 128 may be all or a portion of an enterprise or secured network, while in another implementation, at least a portion of the network 128 may represent a connection to the Internet. In some implementations, a portion of the network 128 may be a virtual private network (VPN). Further, all or a portion of the network 128 can comprise either a wireline or wireless link. Example wireless links may include cellular, 802.11a/b/g/n, 802.20, WiMax, and/or any other appropriate wireless link. In other words, the network 128 encompasses any internal or external network, networks, sub-network, or combination thereof operable to facilitate communications between various computing components inside and outside the illustrated example environment 100. The network 128 may communicate, for example, Internet Protocol (IP) packets, Frame Relay frames, Asynchronous Transfer Mode (ATM) cells, voice, video, data, and other suitable information between network addresses. The network 128 may also include at least one local area network (LAN), radio access network (RAN), metropolitan area network (MAN), wide area network (WAN), all or a portion of the Internet, and/or any other communication system or systems in at least one location. The network 128, however, is not a required component in some implementations of the present disclosure.

As illustrated in FIG. 1, the business process change controller server 102 includes a processor 106. Although illustrated as a single processor 106 in the business process server 102, two or more processors may be used in the business process change controller server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the business process change controller server 102 and, specifically, the functionality associated with the corresponding business process change controller application 110. In one implementation, the business process change controller server 102 processor 106 executes the functionality required to receive and respond to requests and instructions from the at least one client 130, as well as the functionality required to perform the operations of the associated business application 108, business process change controller application 110, the transition rule engine 112, and the temporary step engine 114.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the corresponding business process change controller application 110 stored on the associated business process change controller server 102. In some implementations, a particular business process change controller server 102 may be associated with the execution of two or more business process change controller applications 110, as well as at least one distributed application executing across two or more business process change controller servers 102.

At least one business application 108 is illustrated within the business process change controller server 102. The business application 108 can be any application, program, module, process, or other software that may execute, change, delete, generate, or otherwise manage information associated with a particular business process change controller server 102, and in some cases, a business process performing and executing business process-related events. In particular, business processes communicate with other users, applications, systems, and components to send and receive events. In some implementations, a particular business application 108 may operate in response to and in connection with at least one request received from an associated client 130. Additionally, a particular business application 108 may operate in response to and in connection with at least one request received from other business applications 108, including a business application 108 associated with another business process change controller server 102. In some implementations, each business application 108 may represent a web-based application accessed and executed by remote clients 130 via the network 128 (e.g., through the Internet, or via at least one cloud-based service associated with the business process change controller application 110). Further, while illustrated as internal to the business process change controller server 102, at least one business processes model 118 associated with a particular business application 108 may be stored, referenced, or executed remotely. For example, a portion of a particular business application 108 may be a web service associated with the business application 108 that is remotely called, while another portion of the business application 108 may be an interface object or agent bundled for processing at a remote client 130. Moreover, any or all of a particular business application 108 may be a child or sub-module of another software module or enterprise application (not illustrated) without departing from the scope of this disclosure. Still further, portions of the particular business application 108 may be executed or accessed by a user working directly at the business process change controller server 102, as well as remotely at a corresponding client 130. In some implementations the business process change controller server 102 may execute the business process models using the at least one business application 108.

At least one business process change controller application 110 is illustrated within the business process change controller server 102. Each business process change controller application 110 is any application, program, module, process, or other software that may execute, change, delete, generate, or otherwise manage information associated with a particular business process change controller server 102, and in some cases, a business process performing and executing business process-related events. In some implementations, a particular business process change controller application 110 may operate in response to and in connection with at least one request received from an associated client 130. In some implementations, a particular business process change controller application 110 may operate in response to and in connection with at least one request received from at least one business application 108. Additionally, a particular business process change controller application 110 may operate in response to and in connection with at least one request received from other business process change controller applications 110, including a business process change controller application 110 associated with another business process change controller server 102. Each business process change controller application 110 may be on the same system as the business application 108 or on a different, communicably coupled system. In some implementations, each business process change controller application 110 may represent a web-based application accessed and executed by remote clients 130 via the network 128 (e.g., through the Internet, or via at least one cloud-based service associated with the business process change controller application 110). Further, while illustrated as internal to the business process change controller server 102, at least one business processes model 118 associated with a particular business process change controller application 110 may be stored, referenced, or executed remotely. For example, a portion of a particular business process change controller application 110 may be a web service associated with the business process change controller application 110 that is remotely called, while another portion of the business process change controller application 110 may be an interface object or agent bundled for processing at a remote client 130. Moreover, any or all of a particular business process change controller application 110 may be a child or sub-module of another software module or enterprise application (not illustrated) without departing from the scope of this disclosure. Still further, portions of the particular business process change controller application 110 may be executed or accessed by a user working directly at the business process change controller server 102, as well as remotely at a corresponding client 130. In some implementations the business process change controller server 102 may manage the transition between business process models using the at least one business process change controller application 110.

Additional modules including the transition rule engine 112 and the temporary step engine 114 are illustrated within the business process change controller server 102. All, some, or none of the modules may be included in other business process change controller servers 102. Additionally, some or all of the modules may be combined with each other, as well as integrated into the functionality provided by another component.

The transition rule engine 112 interacts with the business process change controller application 110 to manage the decision to divert a process flow from a first business process model and to redirect the process flow into a second business process model. The transition rule engine 112 accesses a transition rule set 120 stored in memory 116. Generally, transition rules are software code/algorithms that may interact with external and/or internal system components. The transition rule engine 112 may be used to identify business process model entities in a particular business process model 118 and to associate at least one exit transition rule 120 with a first business process model 118. In some implementations, the transition rule engine 112 monitors the status of the transition rules, the values the transition rules return upon being called by a process flow rule, the number of process steps in a first business process model, and the number of process steps in the first business process model that may be executed. In an alternate implementation, the functionality performed by the transition rule engine 112 may be performed by the business process change controller application 110 or other appropriate module of example environment 100 or a module external to the example environment 100 (not shown). Business process model 118 entities may include activities, user tasks, messaging events, gateways, decisions, business process steps, process flow rules 126, or the like associated with a business process model. In some implementations, the transition rule engine 112 (or another component) can provide an interface for users or administrators to modify or override at least one transition rule 120 made by the transition rule engine 112 via at least one client 130 or through a local interface at the business process change controller server 102.

The business process change controller server 102, as illustrated, further includes the temporary process step engine 114. The temporary process step engine 114 accesses a temporary exit process step set stored in memory 116 and can be used to define temporary exit process steps 122 associated with a first business process model 118. In some implementations, temporary exit process steps 122 may manage data used by the first business process model 118 but not needed by the second business process model 118, may terminate and/or modify various activities related to the first business process model that are not applicable to the second business process model 118, or other suitable tasks. The temporary process step engine 114 may also accesses a temporary entry process step set stored in memory 116, and can be used to define temporary entry process steps 124 associated with a second business process model 118. In some implementations, temporary entry process steps 116 may perform actions required by the second business process model 118 by virtue of the fact that the second business process model 118 may be entered at a point requiring, for example, data and processing not performed by the first business process model 118. In some embodiments, the temporary entry process steps 124 may store data required by process steps of the second business process model 118. In other implementations, the temporary entry process steps 124 may prompt for user interaction. In other implementations, the temporary entry process steps 124 may transform varying data formats between the first business process model 118 and the second business process model 118 into a consistent data format.

The temporary process step engine 114 also manages the process flow between a temporary exit process step 122 associated with the first business process model 118 and a corresponding temporary entry process step 124 associated with the second business process model 118 following the redirection of a process flow as defined by a process flow rule 126 by an associated transition rule. In some implementations, the temporary process step engine 114 (or another component) can provide an interface for users or administrators to modify or override at least one temporary exit process step 122 or temporary entry process steps 124 made by the temporary process step engine 114 via at least one client 130 or through a local interface at the business process change controller server 102.

The business process change controller server 102 also includes a memory 116 for storing data and program instructions. The memory 116 may include any memory or database module and may take the form of volatile or non-volatile memory including, without limitation, magnetic media, optical media, random access memory (RAM), read-only memory (ROM), flash memory, removable media, or any other suitable local or remote memory component. The memory 116 may store various objects or data, including classes, frameworks, applications, backup data, business objects, jobs, web pages, web page templates, database tables, process contexts, repositories storing services local to the business process change controller server 102, and any other appropriate information including any parameters, variables, algorithms, instructions, rules, constraints, or references thereto associated with the purposes of the business process change controller server 102 and its business process change controller application 110. In some implementations, including a cloud-based system, some or all of the memory 116 may be stored remote from the business process change controller server 102, and communicably coupled to the business process change controller server 102 for usage. As illustrated, memory 116 includes a set of business process models 118, transition rules 120, temporary exit process steps 122, and temporary entry process steps 124.

In general, a client 130 is any computer device operable to connect or communicate with business process change controller server 102 using a wireless or wireline connection (i.e., network 128). In particular, the client 130 may be embodied as a mobile or non-mobile computing device. At a high level, each client 130 can include a processor 134, a GUI 132, a client application 136, a memory 138, and an interface 140. In general, the client 130 comprises an electronic computer device operable to receive, transmit, process, and/or store any appropriate data associated with a business process change controller applications 110.

The interface 140 of the client 130 may be similar to the interface 104 of the business process change controller server 102, in that it may comprise logic encoded in software and/or hardware in a suitable combination and operable to communicate with the network 128. More specifically, interface 140 may comprise software supporting at least one communication protocol such that the network 128 or hardware is operable to communicate physical signals to and from the client 130. Further, although illustrated as a single interface 140, the interface 140 may be implemented as multiple interfaces in the client 130.

Similarly, memory 138 of the client 130 may include any memory or database module and may take the form of volatile or non-volatile memory including, without limitation, magnetic media, optical media, random access memory (RAM), read-only memory (ROM), removable media, or any other suitable local or remote memory component. For example, memory 138 may store a client application 136, backup data, parameters, cookies, variables, algorithms, instruction, rules, or reference thereto. As illustrated, memory 138 can include any suitable components to interpret and decode messages received at the client 130. Further, although illustrated as a single memory 138, the memory 138 may be implemented as multiple memories in the client 130.

In some implementations, processor 134 may be similar to processor 106. In other implementations, the processor 134 may be a processor designed specifically for use in client 130. Further, although illustrated as a single processor 134, the processor 134 may be implemented as multiple processors in the client 130. Regardless of the type and number, the processor 134 executes instructions and manipulates data to perform the operations of the client 130, including operations to receive and process information from the business process change controller server 102, access data within memory 138, execute the client application 136, as well as perform other operations associated with the client 130.

The client application 136 of the client 130 may retrieve application-related information from a corresponding business process change controller server 102, or the client application may access a local cached set of client-application-related information (not shown) stored on the client 130. In some implementations, the client application 136 may be a web browser. In some implementations, the client-application 136 can use parameters, metadata, and other information received at launch to access a particular set of data from the business process change controller server 102. Once a particular client application 136 is launched, a user can interactively process a task, event, or other information associated with the business process change controller server 102. Further, although illustrated as a single client application 136, the client application 136 may be implemented as multiple client applications in the client 130.

The GUI 132 of the client 130 is a graphical user interface operable to allow the user of the client 130 to interface with at least a portion of the system 100 for any suitable purpose, including to allow a user of the client 130 to interact with at least one of the client application 136 and with the business process change controller server 102. The term "Graphical User Interface", or GUI, may be used in the singular or plural to describe at least one graphical user interface and each of the displays of a particular graphical user interface. Therefore, the GUI 132 can be any graphical user interface, such as a generic web browser, touch screen, or command line interface (CLI) that processes information in the system 100 and efficiently presents the results to a user. Generally the GUI 132 provides the client 130 with an efficient and user-friendly presentation of data provided by or communication within the system 100. In particular, the UI 132 may provide users of the client 130 with visualization representation of the client application 136 and other client 130 functionality. The GUI 132 may include a plurality of user interface UI elements such as interactive fields, pull-down lists, and buttons operable at the client 130.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

Figure 2B:
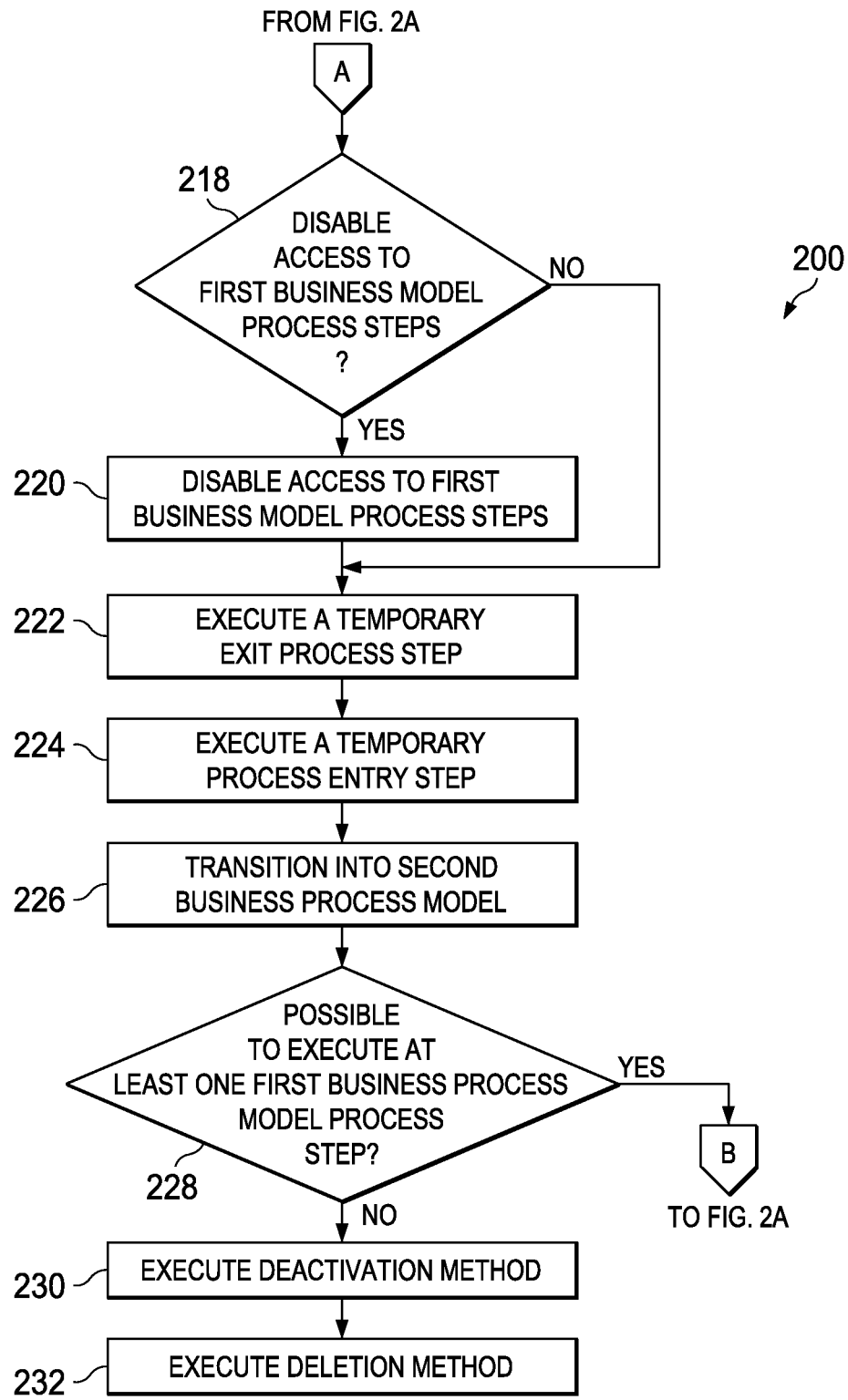

FIGS. 2A-2B illustrate a flowchart of an example method 200 for managing a transition between business process models. For clarity of presentation, the description that follows generally describes method 200 in the context of example environment 100 illustrated in FIG. 1, example environment 300 illustrated in FIG. 3, example environment 400 illustrated in FIG. 4A, an example deactivation method 500, and an example deletion method 600. However, it will be understood that method 200 may be performed, for example, by any other suitable system, environment, or combination of systems and environments, as appropriate.

Referring first to FIG. 2A, method 200 begins at 202. At 202, a second business process model is instantiated in parallel with a first business process model. In some implementations, the first business process model may be instantiated prior to the second business process model. In other implementations, the first business process model may also be executing prior to the instantiation of the second business process model. From 202, method 200 proceeds to 204.

At 204, at least one temporary exit process step is instantiated and associated with the first business process model. At least one temporary entry process step is instantiated and associated with the second business process model. "Associated" does not require and is not restricted to physically proximate grouping or grouping on the same physical computing device, and may be based on a logical grouping. From 204, method 200 proceeds to 205.

Returning to FIG. 2A, at 205, each temporary exit process step is associated with a corresponding temporary entry process step such that a process flow will proceed from a temporary exit process step to its associated temporary entry process step. In alternative implementations, at least one temporary exit process step 122 may be associated with at least one temporary entry process step in order to enable multiple branching and/or parallel-type process flow. With respect to the alternative implementations, additional logic apparent to one of ordinary skill in the art could be used to manage the multiple branching and/or parallel-type process flows. From 204, process 200 continues at 206.

Figure 3:
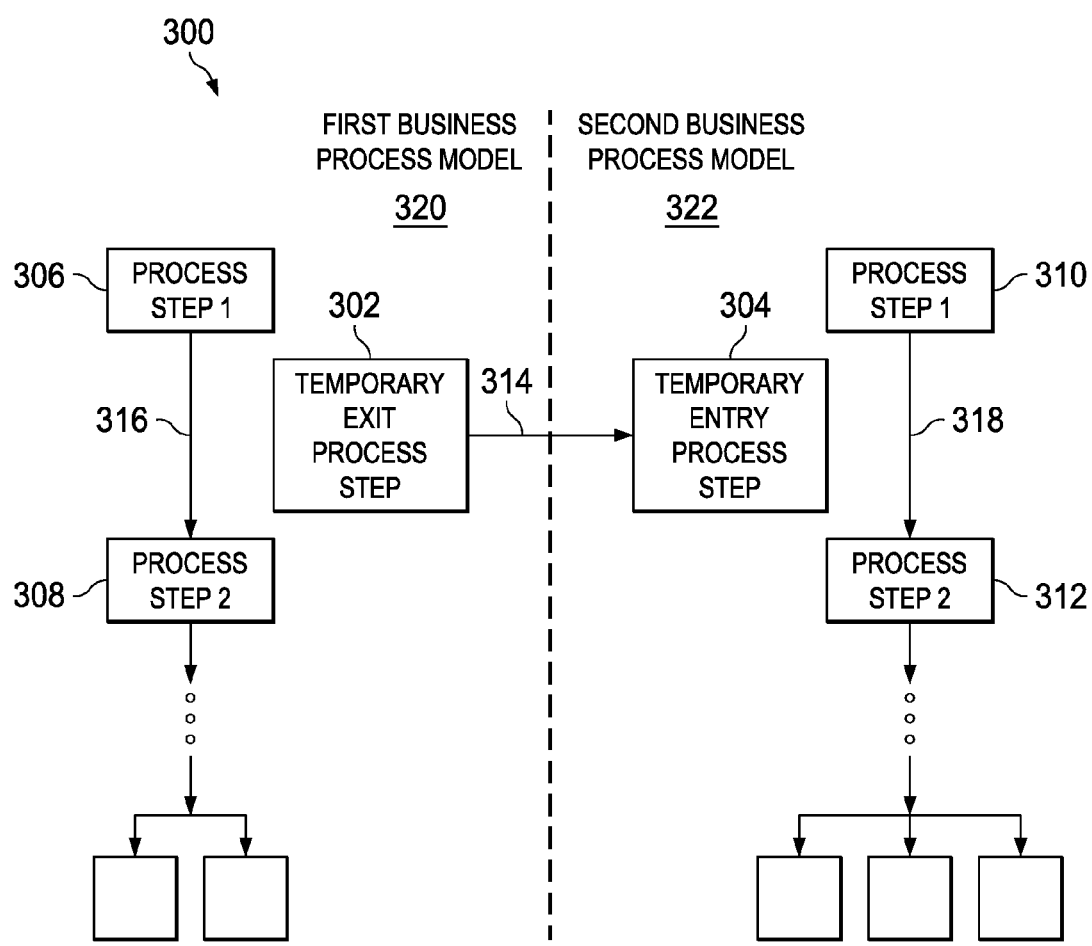
FIG. 3 illustrates an example environment of temporary exit and entry steps in relation to business process models.

Referring now to FIG. 3, FIG. 3 illustrates temporary exit and entry steps in relation to two example business process models. A temporary exit process step 302 is shown associated with a first business process model 320 including business process steps 306 and 308 and process flow rule 316 linking business process steps 306 and 308. Further, a temporary entry process step 304 is shown associated with a second business process model 322 including business process steps 310 and 312 and process flow rule 318 linking business process steps 310 and 312. Further, a temporary exit process step 302 is shown associated with a temporary entry process step 304 linked by a process flow rule 314 directing the process flow from temporary exit process step 302 to temporary entry process step 304. In an alternative implementation, the process flow rule 314 may also direct the process flow in the reverse direction or to some other action or activity (not shown) prior to the process flow entering either the temporary entry process step 304 or the temporary exit process step 302.

Returning to FIG. 2A, at least one exit transition rule associated with the first business process model is instantiated at 206. From 206, method 200 proceeds to 208.

At 208, the at least one exit transition rule is coupled with at least one process flow rule associated with the first business process model. "Coupled" may be understood to mean joining or linking together. In some implementations, an exit transition rule may be coupled to a process flow rule by integrating the transition rule directly into the process flow rule as part of the process flow rule. In another implementation, the exit transition rule may be coupled to a process flow rule via a reference and may remain a logically separate entity from the process flow rule. From 208, method 200 proceeds to 210.

Figure 4A:
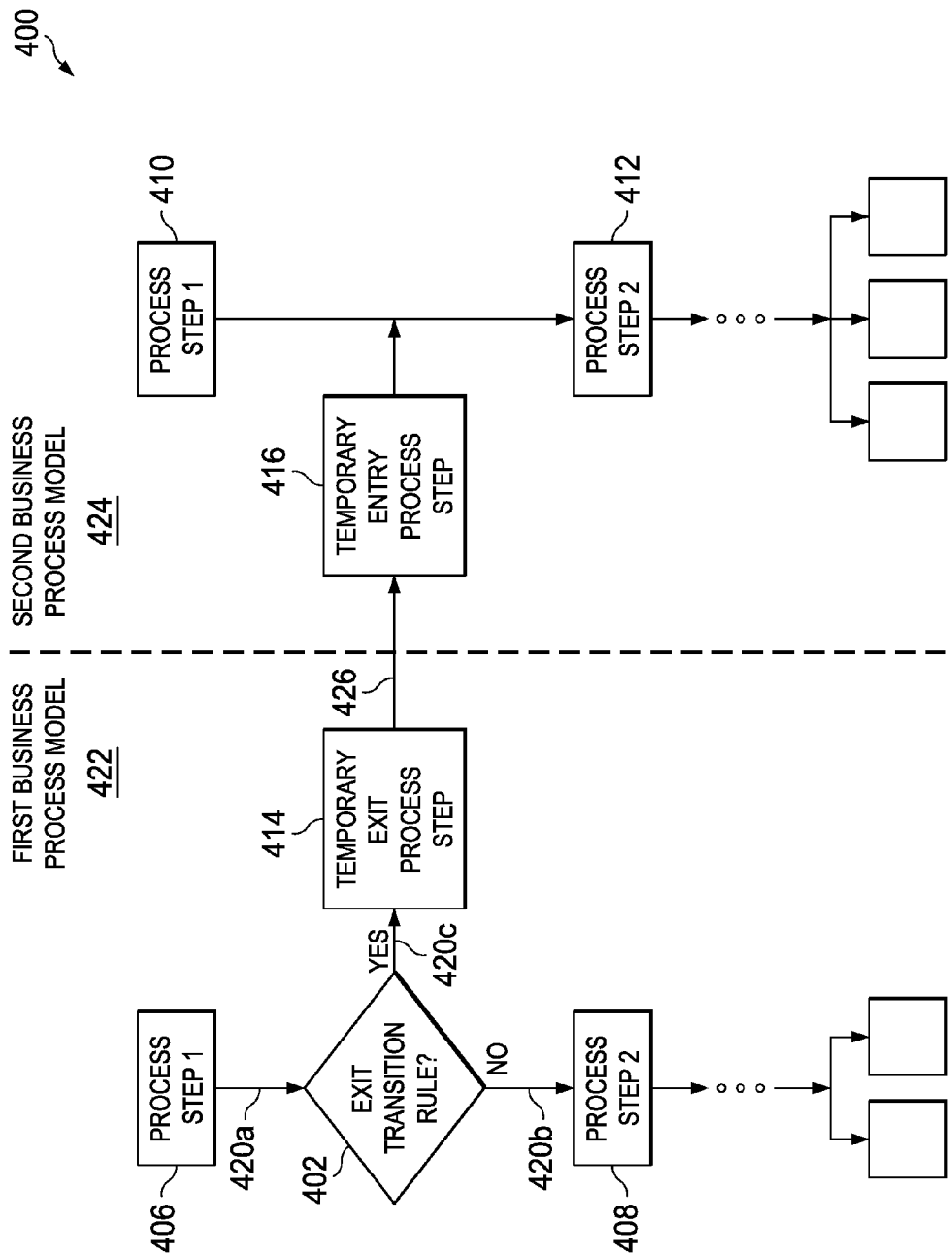
FIG. 4A illustrates an example environment of exit transition rules in relation to temporary exit and entry steps and business process models.

Referring now to FIG. 4A, FIG. 4A illustrates an exit transition rule in relation to a temporary exit and entry step and business process models. An exit transition rule 402 is shown associated with a first business process model 422. The first business process model includes business process steps 406 and 408, process flow rules 420a-c, and temporary exit process step 414. Process flow rule 426 links temporary exit process step 414 with temporary entry process step 416. The second business process model 424 also includes business process steps 410 and 412, process flow rule 418, and temporary entry process step 416. Temporary entry process step 416 may be linked to process flow rule 418 by temporary process flow rule 428. In some implementations, temporary entry process step 416 may perform processing, such as error, status, and other suitable processing.

Returning to FIG. 2A with continuing reference to FIG. 4A, at 210, the at least one exit transition rule 402 associated with the first business process model 422 is activated. In some instances, activating a transition rule may include enabling the transition rule to process data and/or rules associated with a coupled process flow rule and to determine whether to redirect a process flow appropriately. Generally, upon instantiation as described above in 206, transition rules are inactivated by default and, until activated, the coupled process flow passes through the transition rule as if the transition rule was not present. In some implementations, transition rules may be activated by default upon instantiation and/or coupling with the process flow rule, but an external variable, flag, or other indicator prevents them from processing the coupled process flow until the external variable, flag, or other indicator is set to allow processing. From 210, method 200 proceeds to 212.

At 212, the at least one exit transition rule 402 is processed. From 212, method 200 proceeds to 214.

At 214, a determination is made whether exit transition rule 402 should divert a process flow as managed by process flow rule 420a away from process flow rule 420b and to process flow rule 420c. Responsive to a determination that the process flow should be managed by process flow rule 420b, method 200 proceeds to 216. At 216, the business process flow rule 420b manages the process flow and the process flow remains within the first business process model. In another implementation, the process flow rule 420b may direct the process flow back (not shown) to the exit transition rule 118 and may allow the exit transition rule to be processed more than once. From 216, method 200 proceeds to 212. At 212, in some implementations, another at least one exit transition rule 402 associated with the first business process model 422 is processed.

However, if at 214 it is determined to divert and manage the process flow with process flow rule 420c, method 200 continues at 218. At 218, a determination is made whether access to at least one process step of the first business process model 422 following the exit transition rule 402 should be disabled. In some implementations, the determination may be performed by the temporary exit process step 414. In some implementations, the determination may be performed by the transition rule engine. In some implementations, the determination functionality performed by the transition rule engine may instead be performed by the business process change controller application or other appropriate module of example environment 100 or a module external to the example environment 100 (not shown). Responsive to a determination that the at least one process step following the exit transition rule 402 should be disabled, method 200 continues at 220. At 220, access to the at least one process step in the first business process model 422 following the exit transition rule 402 is disabled in the exit transition rule 402. Access to the at least one process step following exit transition rule 402 may be disabled by permanently modifying the transition rule. In another implementation, access to the at least one process step following the exit transition rule 402 may be disabled through the use of an external variable, flag, or other indicator. In other implementations, a subset of the at least one process step following exit transition rule 402 may be disabled while the any remaining process steps in the first business process model 422 remain active. With respect to the alternative implementations, additional logic apparent to one of ordinary skill in the art can be used to manage the alternative implementations. From 220, method 200 continues at 222.

However, if at 218 it is determined that access to the process steps of the first business process model following the exit transition rule 402 need not be disabled, method 200 proceeds to 222. At 222, temporary exit process step 414 is executed. From 222, method 200 proceeds to 224.

At 224, process flow rule 426 directs temporary entry process step 416 to be executed. From 224, method 200 proceeds to 226.

At 226, temporary process flow rule 428 directs the process flow into the process flow rule 418. The process flow continues within the second business process model 424. From 226, method 200 proceeds to 228.

At 228, a determination is made whether it is possible to execute at least one process step associated with the first business process model 422. Responsive to a determination that it is possible to execute at least one process step associated with the first business process model 422, method 200 proceeds to 212. At 212, the process flow returns to the first business process model 422 process flow at FIG. 2A, 216.

If, however, at 228 it is determined that it is not possible to execute at least one process step associated with the first business process model 422, method 200 proceeds to 230. At 230, a deactivation method is executed.

Figure 5:
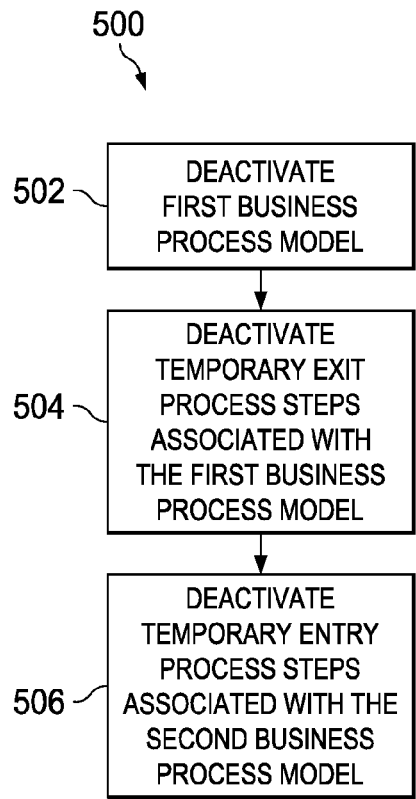
FIG. 5 is a flowchart of an example deactivation method.

Referring now to FIG. 5, FIG. 5 illustrates a deactivation method 500. Method 500 may be performed, for example, by any suitable system, environment, or combination of systems and environments, as appropriate. Method 500 starts at 502.

At 502, the first business process model is deactivated. From 502, method 500 proceeds to 504.

At 504, temporary exit process steps associated with the first business process model are deactivated. In some implementations, only a subset of the temporary exit process steps associated with the first business process model are deactivated. From 504, method 500 proceeds to 506.

At 506, temporary entry process steps associated with the second business process model are deactivated. In some implementations, only a subset of the temporary entry process steps associated with the second business process model are deactivated. Method 500 stops following 506.

Figure 6:
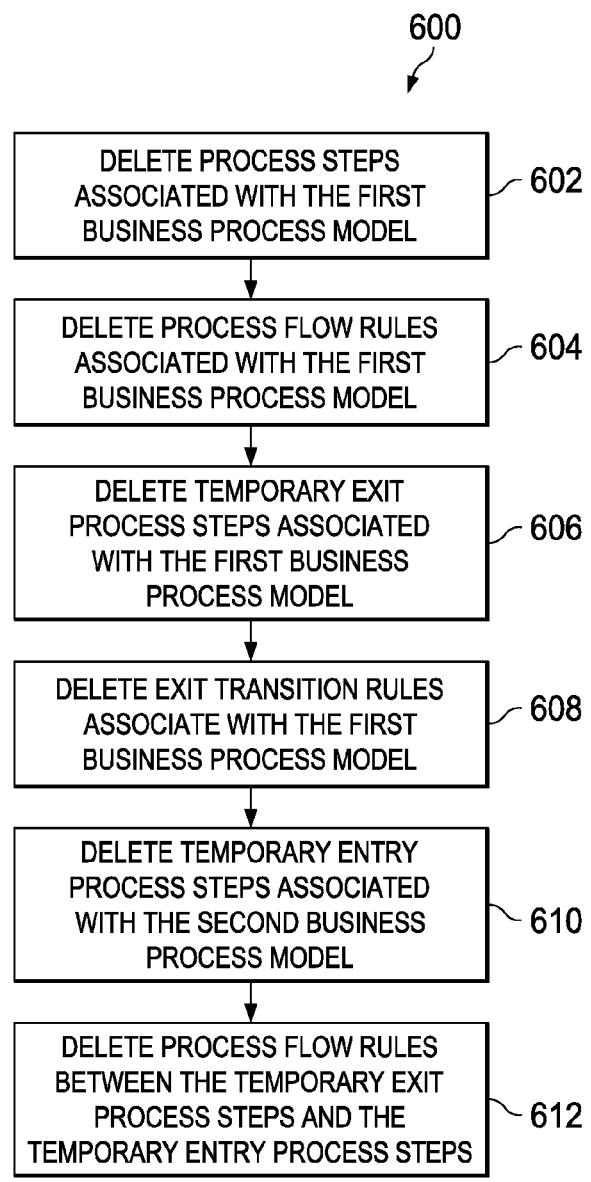
FIG. 6 is a flowchart of an example deletion method.

Returning to FIG. 2B, from 230, method 200 proceeds to 232. At 232, a deletion method is executed Referring now to FIG. 6, FIG. 6 illustrates a deletion method 600. Method 600 may be performed, for example, by any suitable system, environment, or combination of systems and environments, as appropriate. Method 600 starts at 602.

At 602, process steps associated with the first business process model are deleted. From 602, method 600 proceeds to 604.

At 604, process flow rules associated with the first business process model are deleted. In some implementations, only a subset of the process flow rules associated with the first business process model are deleted. From 604, method 600 proceeds to 606.

At 606, temporary exit process steps associated with the first business process model are deleted. In some implementations, only a subset of the temporary exit process steps associated with the first business process model are deleted. From 606, method 600 proceeds to 608.

At 608, exit transition rules associated with the first business process model are deleted. In some implementations, only a subset of the exit transition rules associated with the first business process model are deleted. From 608, method 600 proceeds to 610.

At 610, temporary entry process steps associated with the second business process model are deleted. In some implementations, only a subset of the temporary entry process steps associated with the second business process model are deleted. From 610, method 600 proceeds to 612.

At 612, temporary entry process steps associated with the second business process model are deleted. In some implementations, only a subset of the temporary entry process steps associated with the second business process model are deleted. Method 600 stops following 612.

Returning to FIG. 2B, method 200 stops following 232. At this point, only process steps associated with the second business process model are executed.

Figure 4B:
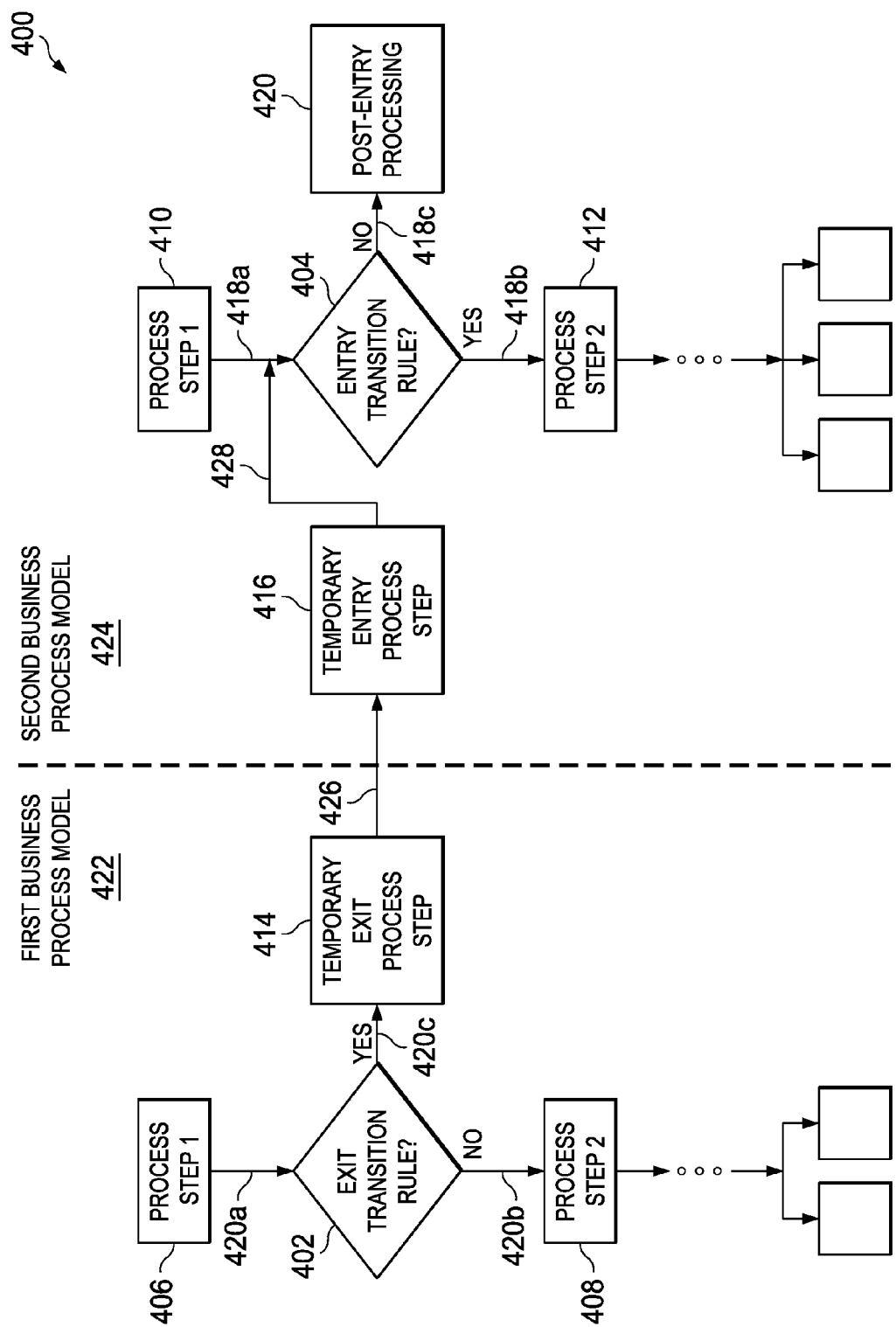
FIG. 4B illustrates an alternate example environment of exit and entry transition rules in relation to temporary exit and entry steps and business process models.

In an alternate implementation, FIG. 4B illustrates transition rules in relation to temporary exit and entry steps and business process models. An exit transition rule 402 and an entry transition rule 404 are shown associated with a first business process model 422 and a second business process model 424, respectively. The first business process model includes business process steps 406 and 408, process flow rules 420*a-c*, and temporary exit process step 414. Process flow rule 426 links temporary exit process step 414 with temporary entry process step 416. The second business process model 424 also includes business process steps 410 and 412, temporary process flow rules 418*a-c*, and temporary entry process step 416. Temporary process flow rules 418*a-c* may replace the original process flow rule linking process step 1 and process step 2 associated with the second business process model. The original process flow rule may be stored for later retrieval and replacement. Temporary entry process step 416 may be linked to an entry transition rule 404 by temporary process flow rule 428. Process step 420 is also optionally linked to entry transition rule 404 by temporary process flow rule 418*c*. Process step 420 may provide post-entry transition rule processing in the event that the entry transition rule 404 does not direct the redirected process flow from the first business process model into the second business process model. In some instances, the operations of 420 may direct execution back to the first business process model 422 or to the temporary exit process step 414 or temporary entry process step 315, as appropriate. Process step 420 may be executed upon, for example, an error condition, a change in data between the time the process flow from the first business process model was redirected to the second process model, and the like. In some implementations, the post-entry transition rule processing is performed by the transition rule engine. In an alternate implementation, the post-entry transition rule processing may be performed by the business process change controller application or other appropriate module of example environment 100 or a module external to the example environment 100 (not shown). With regard to the alternate implementation illustrated in FIG. 4B, those skilled in the art would know, for example, to instantiate and activate the entry transition rule as illustrated in FIG. 2A, modify the deactivation method illustrated in FIG. 5, and modify the deletion method illustrated in FIG. 6 accordingly. There may be other modifications necessary that would be apparent to those skilled in the art that are not shown.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for managing a transition between business process models, comprising:
    in parallel with a first business process model, instantiating, using at least one hardware processor, a second business process model;
    instantiating a temporary exit process step of a set of temporary exit process steps associated with the first business process model and a temporary entry process step of a set of temporary entry process steps associated with the second business process model;
        wherein the temporary exit process step is interoperably coupled to the first business process model, the temporary exit process step is interoperably coupled to the temporary entry process step, and the temporary entry process step is interoperably coupled to the second business process model;
    coupling an exit transition rule of a set of exit transition rules associated with the first business process model to the first business process model; and
    activating the exit transition rule after activating the second business process model;
        wherein the exit transition rule determines whether to execute the temporary exit process step.

2. The computer-implemented method of claim 1, wherein the first business process model and the second business process model each define a set of process steps operable to perform a defined business process.

3. The computer-implemented method of claim 2, wherein each process step is linked to another process step by a process flow rule of a set of process flow rules.

4. The computer-implemented method of claim 1, wherein the first business process model is executing before the instantiation of the second business process model.

5. The computer-implemented method of claim 1, wherein the second business process model reuses at least one process step of the first business process model.

6. The computer-implemented method of claim 1, wherein activating the exit transition rule sets the state of the temporary exit process step to execute.

7. The computer-implemented method of claim 2, wherein, when the exit transition rule is activated, both the first business process model and the second business process model have associated process steps which are executed.

8. The computer-implemented method of claim 3, further comprising deactivating the process flow rule between a first process step and a second process step of the first business process model when a determination indicates the second process step may no longer be executed.

9. The computer-implemented method of claim 3, further comprising executing a deactivation method when no exit transition rule associated with the first business process model indicates that any process step associated with the first business process model may be executed, the deactivation method including:
    deactivating the first business process model;
    deactivating the temporary exit process step; and
    deactivating the temporary entry process step.

10. The computer-implemented method of claim 9, further comprising executing a deletion method following the completion of the deactivation method, the deletion method including:
    deleting the first business process model;
    deleting the temporary exit process step;
    deleting the temporary entry process step; and
    deleting the exit transition rule.

11. A computer program product for managing a transition between business-process models, the computer program product comprising computer-readable instructions embodied on tangible, non-transitory media, the instructions operable when executed to:
    in parallel with a first business process model, instantiate, using at least one hardware processor, a second business process model;
    instantiate a temporary exit process step of a set of temporary exit process steps associated with the first business process model and a temporary entry process step of a set of temporary entry process steps associated with the second business process model;
        wherein the temporary exit process step is interoperably coupled to the first business process model, the temporary exit process step is interoperably coupled to the temporary entry process step, and the temporary entry process step is interoperably coupled to the second business process model;
    couple an exit transition rule of a set of exit transition rules associated with the first business process model to the first business process model; and
    activate the exit transition rule after activating the second business process model;
        wherein the exit transition rule determines whether to execute the temporary exit process step.

12. The computer program product of claim 11, wherein the first business process model and the second business process model each define a set of process steps operable to perform a defined business process.

13. The computer program product of claim 12, wherein each process step is linked to another process step by a process flow rule of a set of process flow rules.

14. The computer program product of claim 11, wherein the first business process model is executing before the instantiation of the second business process model.

15. The computer program product of claim 11, wherein the second business process model reuses at least one process step of the first business process model.

16. The computer program product of claim 11, wherein activating the exit transition rule sets the state of the temporary exit process step to execute.

17. The computer program product of claim 12, wherein, when the exit transition rule is activated, both the first business process model and the second business process model have associated process steps which are executed.

18. The computer program product of claim 13, the instructions further operable to deactivate the process flow rule between a first process step and a second process step of the first business process model when a determination indicates the second process step may no longer be executed.

19. The computer-implemented method of claim 13, further comprising executing a deactivation method when no exit transition rule associated with the first business process model indicates that any process step associated with the first business process model may be executed, the deactivation method including:
   deactivate the first business process model;
   deactivate the temporary exit process step; and
   deactivate the temporary entry process step.

20. The computer-implemented method of claim 19, further comprising executing a deletion method following the completion of the deactivation method, the deletion method including:
   delete the first business process model;
   delete the temporary exit process step;
   delete the temporary entry process step; and
   delete the exit transition rule.

21. A system for managing a transition between business process models, comprising:
   memory operable to store a first business process model and a second business process model; and
   at least one hardware processor operable to:
      in parallel with a first business process model, instantiate a second business process model;
      instantiate a temporary exit process step of a set of temporary exit process steps associated with the first business process model and a temporary entry process step of a set of temporary entry process steps associated with the second business process model;
         wherein the temporary exit process step is interoperably coupled to the first business process model, the temporary exit process step is interoperably coupled to the temporary entry process step, and the temporary entry process step is interoperably coupled to the second business process model;
      couple an exit transition rule of a set of exit transition rules associated with the first business process model to the first business process model; and
      activate the exit transition rule after activating the second business process model;
         wherein the exit transition rule determines whether to execute the temporary exit process step.

* * * * *